Figure 1:
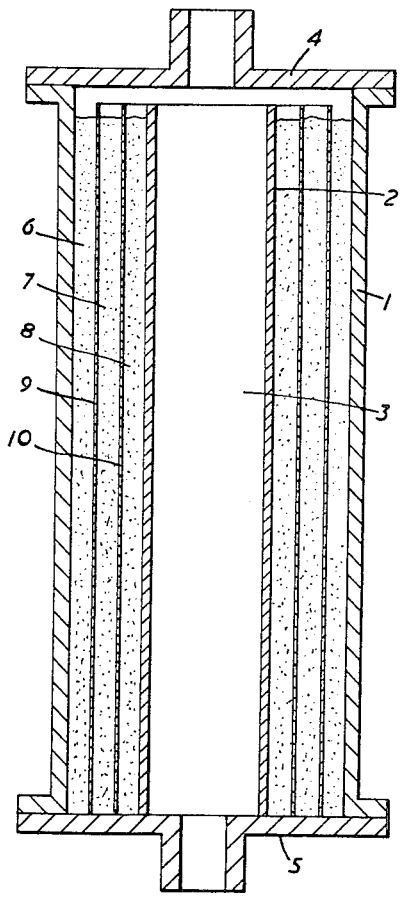

Jan. 25, 1966     P. S. MURTHY ETAL     3,231,339
THERMALLY INSULATED REACTION VESSELS
Filed Sept. 13, 1963     2 Sheets-Sheet 1

Inventors
P. S. MURTHY
R. F. EDGE
By
Holcombe, Wetherill & Brisebois
Attorneys

United States Patent Office

3,231,339
Patented Jan. 25, 1966

3,231,339
THERMALLY INSULATED REACTION VESSELS
Panchagnula Srinivasa Murthy, Chembur, Bombay, India, and Ronald Forfar Edge, Solihull, England, assignors to The Gas Council, London, England, a British statutory corporation of Murdoch House
Filed Sept. 13, 1963, Ser. No. 308,820
11 Claims. (Cl. 23—290)

This invention relates to improvements in thermally insulated reaction vessels which are provided with an inner wall enclosing the reaction zone and an outer wall, which is spaced from the inner wall and is in contact with the atmosphere, and in which the space between the inner and outer walls serves to accommodate a thermally insulating material, for example, a free-flowing particulate insulating material or an insulating brickwork. Such reaction vessels may be used for carrying out reactions under atmospheric pressure, or under superatmospheric pressure provided that they are constructed to withstand the pressure used. In the latter case the said space is in communication with the reaction zone so that the pressure in the space is the same as that in the reaction zone.

Such an arrangement of thermally insulating material is not entirely satisfactory, because it is difficult to avoid the existence or formation of voids or fissures within the insulating material that permit convection currents to flow through the insulating material so as to cause the transfer of heat from the inner wall to the outer wall of the reaction vessel. Thus, for example, the voids within a free-flowing particulate insulating material may permit the flow of such convection currents.

In the case of brickwork it is difficult to construct it without fissures, and, even if this can be done, cracks develop therein during use owing to changes in temperature and/or pressure. The circulation of gas within the insulating material causing heat transfer may also occur due to the presence of voids or fissures therein.

The present invention provides a reaction vessel which comprises an inner wall enclosing the reaction zone and an outer wall which is in contact with the atmosphere and is spaced from the inner wall to form a space serving to accommodate a thermally insulating material, and wherein the said space is divided into a plurality of compartments by means of one or more partitions, each of which extends through the said space in a direction transversely of the width of the latter, is spaced from the inner and outer walls and from any adjacent partition, and prevents substantially throughout its length the flow of gas between the compartments it separates.

The reaction vessel may comprise inner and outer walls of elongated tubular shape spaced apart to form between them a thermal insulation space of annular cross-section, one or more partitions of elongated tubular shape spaced from the said walls and from any adjacent partition to form within the said space compartments of annular cross-section, two end walls each closing one end of the tubular outer wall inlet means for the introduction of reactants into the reaction zone, and outlet means for the discharge of reaction products from the reaction zone. The inlet end outlet means are advantageously provided in the end walls. The inlet means may be provided in one end wall and the outlet means in the other end wall, if the reaction products are to be withdrawn from the end of the reaction zone opposite to that into which the reactants are introduced; or both the inlet and outlet means may be provided in one end wall, if the reactants are to be introduced and the reaction products discharged from the same end of the reaction zone.

In the case of a reaction vessel to be used, for example, for carrying out reactions under superatmospheric pressure, pressure equalisation between the reaction zone and the thermal insulation space between the inner and outer walls may be achieved by so constructing or arranging the inner wall and each partition that restricted communication exists between the reaction zone and all the compartments, when charged with thermally insulating material.

For this purpose there may be provided a restricted path of communication that connects all the compartments across their width with the reaction zone. This path of communication may be outside the region occupied by the thermally insulating material. For example, in a reaction vessel having tubular inner and outer walls and tubular partitions, as described above, the inner wall and each partition may extend from the inner surface of one end wall and terminate a short distance from the inner surface of the other end wall. Thus, a restricted path of communication extends across the open ends of the reaction zone and of all the compartments, and therefore beyond the thermally insulating material within the compartments. Alternatively, the restricted path of communication may be within the region of the thermally insulating material. For example, the inner wall and the partitions may at each end extend to the inner surface of the adjacent end wall, and perforations may be formed in the inner wall and the partitions to form a restricted path of communication extending from the reaction zone across the width of all the compartments through the thermally insulating material.

Alternatively, there may be provided a restricted path of communication that connects all the compartments in series along their lengths with the reaction zone. In this case the path of communication extends from the reaction zone into one end of the compartment adjacent to the inner wall, then from the opposite end of that compartment into the adjacent end of the next compartment, and similarly from the opposite end of the latter compartment into the adjacent end of any succeeding compartment. The path of communication thus extends through the thermally insulating material in each compartment. For example, in a reaction vessel having tubular inner and outer walls and tubular partitions, the arrangement may be such that the inner wall extends from the inner surface of one end wall and terminates a short distance from the inner surface of the other end wall to form a restricted opening leading to the reaction zone, the tubular partition adjacent to the inner wall at one of its ends confines communication through the said opening to the adjacent end of the compartment on its inner side and at its other end provides restricted communication between the adjacent ends of the compartments it separates, and any succeeding partitions provide restricted communication alternately at opposite ends thereof between the adjacent ends of the compartments they separate.

Within each of the compartments, there will be some transfer of heat as a result of conduction and/or convection within the gas in the compartment, and the rate of transfer of heat will depend in part upon the composition of the gas. In the case of certain gases, especially hydrogen (which has a high thermal conductivity and a high specific heat) and gaseous mixtures consisting mainly of hydrogen, the rate of transfer of heat within each compartment may somewhat reduce the insulation effect and, in order to prevent such gases penetrating into the thermal insulation space from the reaction zone by reason of the aforesaid restricted communication, gas inlet means may be provided within the thermal insulation space for causing a gas having relatively poor heat transfer characteristics for example, carbon dioxide to flow through the said space and into the reaction zone.

The outer wall of the reaction vessel will generally be of metal, for example, steel, particularly when the vessel is constructed for operation at superatmospheric pressure. The inner wall may also be of metal, for example, steel, but it may be constructed of nonmetallic material, for example, a refractory brickwork having a refractory facing applied, for example, by spraying a refractory composition, such as that known under the trade name "Gunite," on to the surface of the brickwork. The partitions may be of metal, for example, mild steel or heat-resisting steel, but they may be constructed of a nonmetallic gas-impermeable material, for example, gas-impermeable alumina.

The thermally insulating material is preferably a free-flowing particulate material, for example, powdered alumina, but it may be a coherent material, for example, a thermally insulating brickwork.

Reaction vessels in accordance with the invention may be constructed for carrying out reactions under atmospheric or superatmospheric pressure, and at high temperatures or even relatively low temperatures, so that it is not essential that the materials of which the walls, partitions and thermally insulating material are composed should be resistant to high temperatures. For operation under superatmospheric pressure the outer walls of the vessel in contact with the atmosphere must, of course, be constructed to withstand the pressure used, and restricted communication between the reaction zone and the thermal insulation space will be provided.

The reaction vessels may be used for carrying out reactions between gases and/or vapours. Solids may also be present and may or may not take part in the reaction. Such solids are preferably maintained in the form of a fluidised bed in the reaction zone, and in this case the inner wall is preferably of metal.

A reaction vessel constructed in accordance with the invention may be used for carrying out the process described in the specification of copending United States patent application Serial No. 263,930, filed March 8, 1963 in the name of B. B. Majumdar et al. for the vapour phase hydrogenation of a hydrocarbon distillate oil. For carrying out that process the said specification describes a thermally insulated reaction vessel having a tubular inner wall enclosing the reaction zone and a tubular outer wall which is spaced from the inner wall and is in contact with the atmosphere, thermally insulating material in the space between the inner and outer walls, and end walls closing each end of the outer wall. In the reaction zone is mounted a hollow cylindrical member which is shorter than the reaction zone and divides the latter into an inner region of cylindrical cross-section and an outer region of annular cross-section, the two regions being in communication with each other beyond the ends of the hollow cylindrical member. The reactants are introduced into the reaction zone through orifice means in one of the end walls, the reactants and reaction products circulate through the cylindrical and annular regions of the reaction zone, and the reaction products are withdrawn, for example, through an outlet tube in the end wall having the orifice means therein. When a reaction vessel in accordance with the present invention is used in the above process, the thermal insulation space between the aforesaid tubular inner wall and tubular outer wall of a reaction vessel as described in the aforesaid specification will be divided by means of partitions into compartments to accommodate a thermally insulating material as hereinbefore described.

Figure 2:
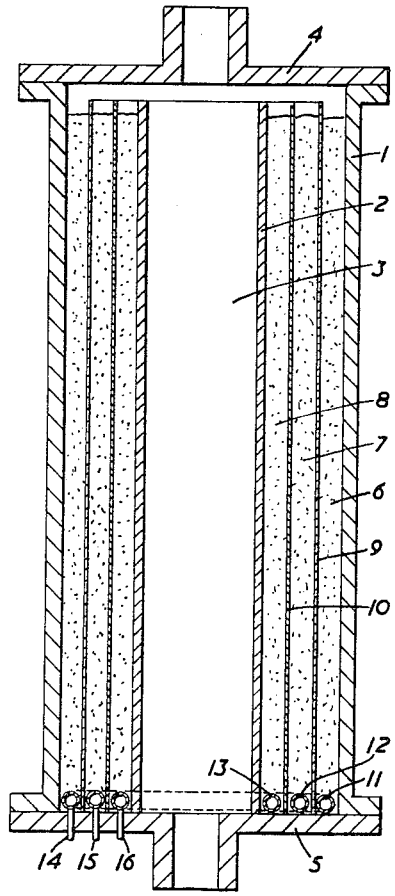
Figure 3:
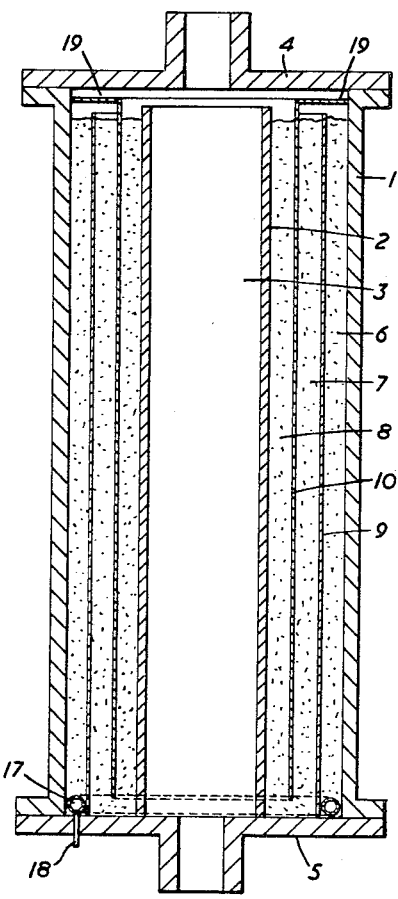
Figure 4:
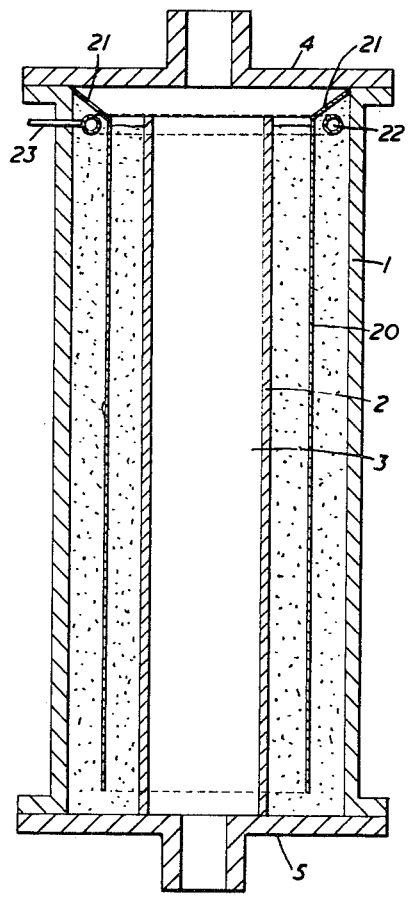

Reaction vessels constructed in accordance with the invention are shown by way of example in the accompanying drawings, in which like reference numerals indicate like parts, and FIGURE 1 shows in axial longitudinal cross-section one form of reaction vessel and FIGURES 2, 3 and 4 show similar cross-sections of other forms of reaction vessels having means for preventing the penetration of a gas that would give a relatively high heat transfer into the thermal insulation space.

Referring to FIGURE 1, the reaction vessel comprises a cylindrical outer wall 1 capable of withstanding superatmospheric pressures within the vessel, a cylindrical inner wall 2 enclosing the reaction zone 3 and mounted coaxially within the outer wall and spaced therefrom, and two end walls 4 and 5 each having an opening serving as an inlet to or outlet from the reaction zone. The inner wall 2 terminates at its upper end slightly below the lower surface of the end wall 4, so that the space between the outer and inner walls is in restricted communication with the reaction zone. The said space is divided into three compartments 6, 7 and 8 by means of two cylindrical partitions 9 and 10, which extend through the said space in a direction transversely of its width and are coaxial with the inner and outer walls of the reaction vessel. The upper ends of the partitions 9 and 10 terminate slightly below the lower surface of the end wall 4 so that the pressure in each compartment will be the same as that in the reaction zone. Each compartment is filled with a free-flowing particulate thermally insulating material, for example, powdered alumina. The partitions may be made of metal, for example, mild steel or heat resisting steel. Instead of two partitions, there may be one partition forming two compartments, or more than two partitions, for example, three partitions forming four compartments.

In FIGURE 2 is shown a reaction vessel similar to that shown in FIGURE 1, with the exception that there is provided at the lower end of each compartment 6, 7 and 8, an annular tube 11, 12 and 13 respectively, each of which has perforations (not shown) in its wall for the introduction into the compartment of a gas supplied to each tube through an inlet pipe 14, 15 and 16 respectively. Thus, a gas that would give a relatively high heat transfer, such as hydrogen, is prevented from penetrating from the reaction zone 3 into the particulate material within each compartment by the introduction of a gas of relatively poor heat transfer characteristics, for example, carbon dioxide, from the respective annular tube, which gas passes through the particulate material and out of the opposite end of each compartment into the reaction zone.

In FIGURE 3 is shown a reaction vessel similar to that shown in FIGURE 1, except that the partition 10 terminates at its lower end slightly above the upper surface of the end wall 5, and has at its upper end a flange 19 that extends to the inner surface of the outer wall 1 and is spaced a short distance above the upper end of the partition 9, and that a perforated annular tube 17 having an inlet pipe 18 is provided at the lower end of the compartment 6. In this case, a gas of relatively poor heat transfer characteristics is passed from the tube 17 in succession through the particulate material in the compartments 6, 7 and 8 and hence into the reaction zone.

In FIGURE 4 is shown a similar reaction vessel having a single partition 20, which has at its upper end an inclined flange that closes the upper end of the compartment between the partition 20 and the outer wall 1, and of which the lower end terminates slightly above the upper surface of the end wall 5. A gas of relatively poor heat transfer characteristics is passed from an annular perforated tube 22 having an inlet pipe 23 at the upper end of the aforesaid compartment downwardly through the particulate material therein, round the lower end of the partition 20, upwardly through the particulate material in the compartment between the partition 20 and the inner wall 2, and into the reaction zone.

It will be seen that in all the reaction vessels shown in the drawings there is a restricted path of communication between all the compartments and the reaction zone, and that the partitions prevent the flow of gas through the insulating material from one compartment to another substantially throughout the lengths of the partitions. The provision for slight gas flow above some of the partitions and below other partitions, is not such as materially to affect the improved thermal insulation afforded by the partitions.

We claim:

1. A thermally insulated reaction vessel for carrying out reactions under superatmospheric pressure, which comprises an inner wall bounding the reaction zone, a pressure-resistant outer wall which is in contact with the atmosphere and is spaced from the inner wall to form a thermal insulation space, and one or more substantially gas-impervious partitions that divide the said space into a plurality of compartments, each partition extending through the said space in a direction transversely of the width of the latter, being spaced from the inner and outer walls and any adjacent partition and each compartment being charged with thermally insulating material, and all the compartments being in restricted communication with the reaction zone.

2. A reaction vessel as claimed in claim 1, wherein the compartments are in restricted communication with the reaction zone along a path that connects all the compartments across their widths with the reaction zone.

3. A reaction vessel as claimed in claim 2, wherein the said path is outside the region occupied by the thermally insulating material.

4. A reaction vessel as claimed in claim 2, wherein the said path is within the region of the thermally insulating material.

5. A reaction vessel as claimed in claim 1, wherein the compartments are in restricted communication with the reaction zone along a path that connects all the compartments in series along their lengths with the reaction zone.

6. A reaction vessel as claimed in claim 1, wherein gas inlet means is provided within the thermal insulation space for introducing into said compartments a gas which is a poor conductor of heat to prevent the flow of gases from the reaction zone into the thermally insulating material in said compartments.

7. A reaction vessel as claimed in claim 1, which comprises inner and outer walls of elongated tubular shape spaced apart to form between them a thermal insulation space of annular cross-section, one or more partitions of elongated tubular shape spaced from the said walls and from any adjacent partition to form within the said space compartments of annular cross-section, two end walls each closing one end of the tubular outer wall, inlet means for the introduction of reactants into the reaction zone, and outlet means for the discharge of reaction products from the reaction zone.

8. A reaction vessel as claimed in claim 7, wherein the inlet means is provided in one end wall and the outlet means in the other end wall.

9. A reaction vessel as claimed in claim 7, wherein the inlet means and the outlet means are provided in one end wall.

10. A reaction vessel as claimed in claim 7, wherein the inner wall and each partition extend from the inner surface of one end wall and terminate a short distance from the inner surface of the other end wall to afford restricted communication between all the compartments and the reaction zone.

11. A reaction vessel as claimed in claim 7, wherein the inner wall extends from the inner surface of one end wall and terminates a short distance from the inner surface of the other end wall to form a restricted opening leading to the reaction zone, the tubular partition adjacent to the inner wall at one of its ends confines communication through the said opening to the adjacent end of the compartment on its inner side and at its other end provides restricted communication between the adjacent ends of the compartments it separates, and any succeeding partitions provide restricted communication alternately at opposite ends thereof between the adjacent ends of the compartments they separate.

References Cited by the Examiner
UNITED STATES PATENTS 1,920,886   8/1933   Pier et al.
2,548,519   4/1951   Cummings _____ 23—288

MORRIS O. WOLK, *Primary Examiner.*

JAMES H. TAYMAN, *Examiner.*